No. 761,250. PATENTED MAY 31, 1904.
E. F. PORTER.
ELECTRIC HEATER.
APPLICATION FILED OCT. 17, 1898.
NO MODEL.
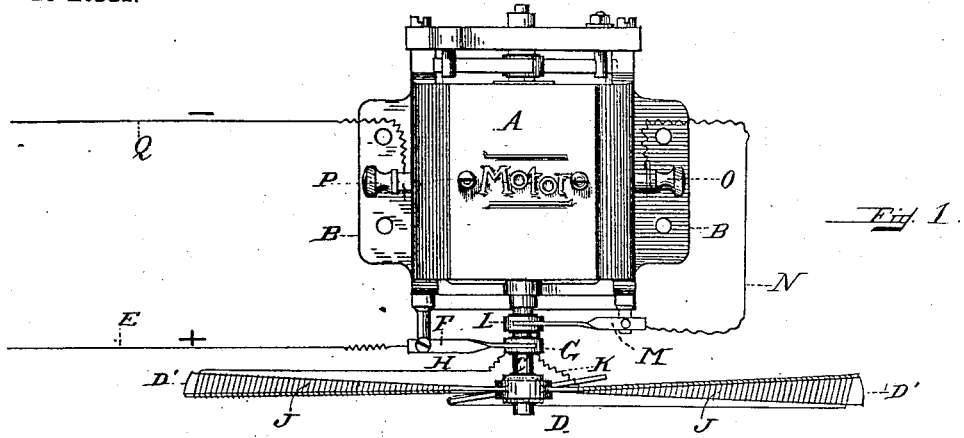
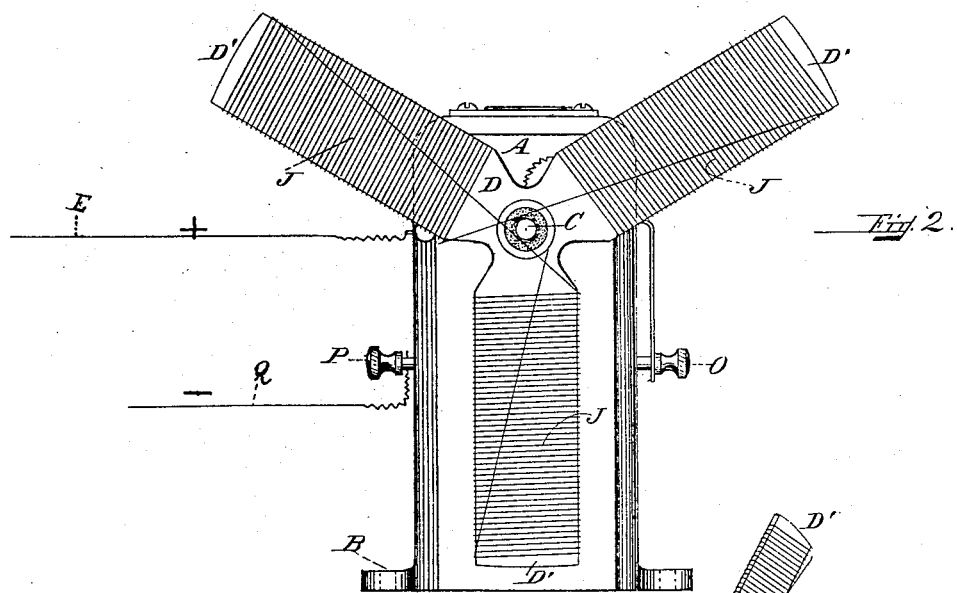
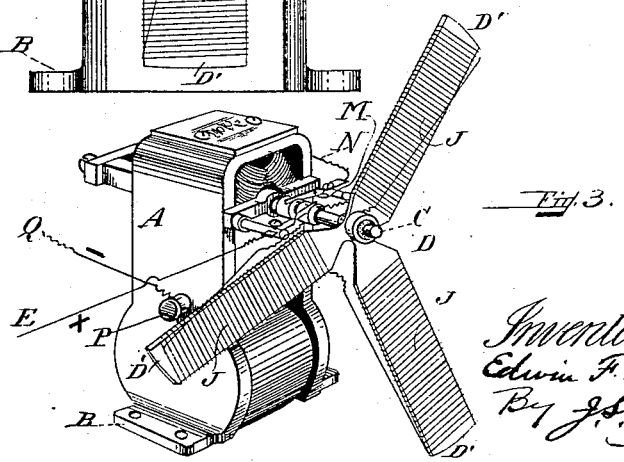

No. 761,250.

Patented May 31, 1904.

UNITED STATES PATENT OFFICE.

EDWIN F. PORTER, OF BOSTON, MASSACHUSETTS, ASSIGNOR, BY MESNE ASSIGNMENTS, TO BENJAMIN F. PEACH, OF LYNN, MASSACHUSETTS.

ELECTRIC HEATER.

SPECIFICATION forming part of Letters Patent No. 761,250, dated May 31, 1904.

Application filed October 17, 1898. Serial No. 693,714. (No model.)

*To all whom it may concern:*

Be it known that I, EDWIN F. PORTER, of Boston, in the county of Suffolk and State of Massachusetts, have invented certain new and useful Improvements in Electric Heaters, of which the following is a specification.

My invention relates to electric heating apparatus and is in the nature of an improvement on the electric heating apparatus shown in the patent to Mark W. Dewey, No. 449,404, dated March 31, 1891.

The object of my invention is to rapidly generate and diffuse heat from heat-developing electric conductors or resistances, the main object, however, being to supply a combination of parts which will insure absolute safety to the apparatus by means of the unity of its construction, which is the placing of the motor which runs the fan and the heat-developing electric resistances in series in the same circuit, thereby rendering it impossible to run either the heater or the motor independently. If the circuit be broken at any point, the entire apparatus, both motor and heater, becomes inoperative. In actual practice with fan-heaters one requirement and advantage is that the heating-wires are kept down to a low temperature by the rapid flow of the air from the fan, and it has been necessary to caution those who use fan-heaters to turn off the heat before stopping the fan, or in cases of accident the motor-circuit may become disconnected, leaving the heater in operation, and too high a temperature would be produced, endangering the heater and sacrificing one of the great advantages of circulating the air freely over the heating-surfaces which is realized in a fan-heater over the ordinary stationary electric heater. By the arrangement disclosed it will be seen that it is impossible to run the heater without running the fan at the same time, therefore rendering it impossible to raise the temperature of the wires to too high a degree with the danger of burning out the same, and when it is necessary to start the apparatus but one circuit is used for the purpose, and the heater and fan by the throw of this one switch are started and stopped simultaneously. In this apparatus the heating resistance takes the place of the ohmic resistance obtained in the usual motor by numerous ampere-windings of the armature and field, as the current passing through the heater is cut down to the proper amperage for the requisite heat and is passed through a few windings in the motor just sufficient to give the proper magnetic force for running the fan. By this arrangement it will be seen that the motor may be made very much smaller and lighter and at a much reduced cost from the commercial motors on the market running on a high voltage—for instance, one hundred and ten volts. The motors used commercially on this voltage weigh about twenty or twenty-five pounds. This weight seems to be a necessary feature of these motors in order to get a sufficient amount of wire in the windings, which amount, as has been above stated, is greatly reduced by including the necessary ohmic resistance in the heater itself. By this construction it is found in practice that the motor may be made of one-quarter the size and weight and proportionally less in cost than the motors now in commercial use on one-hundred-and-ten-volts circuit, or thereabout.

My invention consists of certain novel features hereinafter described, and particularly pointed out in the claims.

In the accompanying drawings, which illustrate a construction embodying my invention, Figure 1 is a plan view of an electrically-heated fan and motor in series. Figs. 2 and 3 represent, respectively, a front and perspective view of the same.

Like letters of reference refer to like parts throughout the several views.

A represents an electric motor of any desired construction, provided with a base B, by which it is secured in place. The shaft C, operated by said motor, carries on its end the fan D, fast thereon, so as to revolve therewith, and said fan consists of a series of blades D'.

E represents an electric conductor through which the current passes from a suitable source of electricity to the brush F and from said brush F to the collector-ring G, fast on the shaft C and insulated therefrom. The current then passes from said ring G through the wire H, which is wrapped around each of the blades of the fan, to form on each of the blades the resistances J for heating, and the end of said wire, which is marked K, passes through insulation on the collector-ring G and terminates in electric contact with the collector-ring L, which is insulated from the shaft C and fast thereon. The current then passes by the brush M to the wire N, and from said wire to the binding-post O, and from said binding-post to the motor A to operate the same, and then to the binding-post P, and then the current passes off by means of the conductor Q, secured to said binding-post.

It is obvious from the above description that during all the time the circuit is through the motor the current is passing through the heater, so that the heater is constantly in series with the motor while the circuit is closed through the motor.

I do not limit myself to the arrangement and construction shown, as the same may be varied without departing from the spirit of my invention.

Having thus ascertained the nature of my invention and set forth a construction embodying the same, what I claim as new, and desire to secure by Letters Patent of the United States, is—

1. In an apparatus of the character specified, one or more heat-developing electric conductors forming an electric heater, movable means as a fan for removing or displacing the heat from said heater, a motor for operating said movable means and offering less resistance to the current than the heater, and an electric conductor continuously in series with both heater and motor while the circuit is closed through the motor and adapted to energize both the heater and motor coincidentally, the said heater forming a permanent resistance to the electric current while the circuit is closed through the motor.

2. In an apparatus of the character specified, a fan, one or more heat-developing electric conductors forming an electric heater and mounted on said fan, a motor for operating the fan and offering less resistance to the current than the heater, and an electric conductor continuously in series with both heater and motor while the circuit is closed through the motor and adapted to energize both the heater and motor coincidentally, the said heater forming a permanent resistance to the electric current while the circuit is closed through the motor.

3. In an apparatus of the character specified, one or more heat-developing electric conductors forming an electric heater, a fan mounted on the same support as the heater for removing or displacing the heat from said heater, a motor for operating said fan and offering less resistance to the current than the heater, and an electric conductor continuously in series with both heater and motor while the circuit is closed through the motor and adapted to energize both the heater and motor coincidentally, the said heater forming a permanent resistance to the electric current while the circuit is closed through the motor.

4. In an apparatus of the character specified, a movable electric heater consisting of one or more heat-developing electric conductors, a motor for moving said heater to remove or displace the heated air therefrom and offering less resistance to the current than the heater, and an electric conductor continuously in series with both heater and motor while the circuit is closed through the motor and adapted to energize both the heater and motor coincidentally, the said heater forming a permanent resistance to the electric current while the circuit is closed through the motor.

5. In an apparatus of the character specified, a fan, one or more heat-developing electric conductors forming an electric heater and mounted on the blades of said fan, a motor for operating said fan for removing or displacing the heated air from said heater and offering less resistance to the current than the heater, and an electric conductor continuously in series with both heater and motor while the circuit is closed through the motor and adapted to energize both the heater and motor coincidentally, the said heater forming a permanent resistance to the electric current while the circuit is closed through the motor.

6. In an apparatus of the character specified, one or more heat-developing electric conductors forming an electric heater, a rotary fan for removing or displacing the heat from said heater, a motor for operating said rotary fan and offering less resistance to the current than the heater, and an electric conductor continuously in series with both heater and motor while the circuit is closed through the motor and adapted to energize both the heater and motor coincidentally, the said heater forming a permanent resistance to the electric current while the circuit is closed through the motor.

7. In an apparatus of the character described, one or more heat-developing electric conductors forming an electric heater, movable means as a fan for removing or displacing the heat from said heater, a motor for operating said movable means, and an electric circuit continuously in series with both heater and motor while the circuit is closed through the motor and adapted to energize both the heater and motor coincidentally, the said heater forming a permanent resistance to the electric current while the circuit is closed through the motor.

8. In an apparatus of the character described, one or more heat-developing electric conductors forming an electric heater, a fan for removing or displacing the heat from said heater, a motor for operating said fan, and an electric circuit continuously in series with both heater and motor while the circuit is closed through the motor and adapted to energize both heater and motor coincidentally, the said heater forming a permanent resistance to the electric current while the circuit is closed through the motor.

In testimony whereof I have signed my name to this specification, in the presence of two subscribing witnesses, this 13th day of October, A. D. 1898.

EDWIN F. PORTER.

Witnesses:
A. L. MESSER,
C. A. STEWART.